Nov. 11, 1930.                C. C. SPREEN                1,781,201
                            JOURNAL BEARING SEAL
                            Filed Dec. 6, 1926
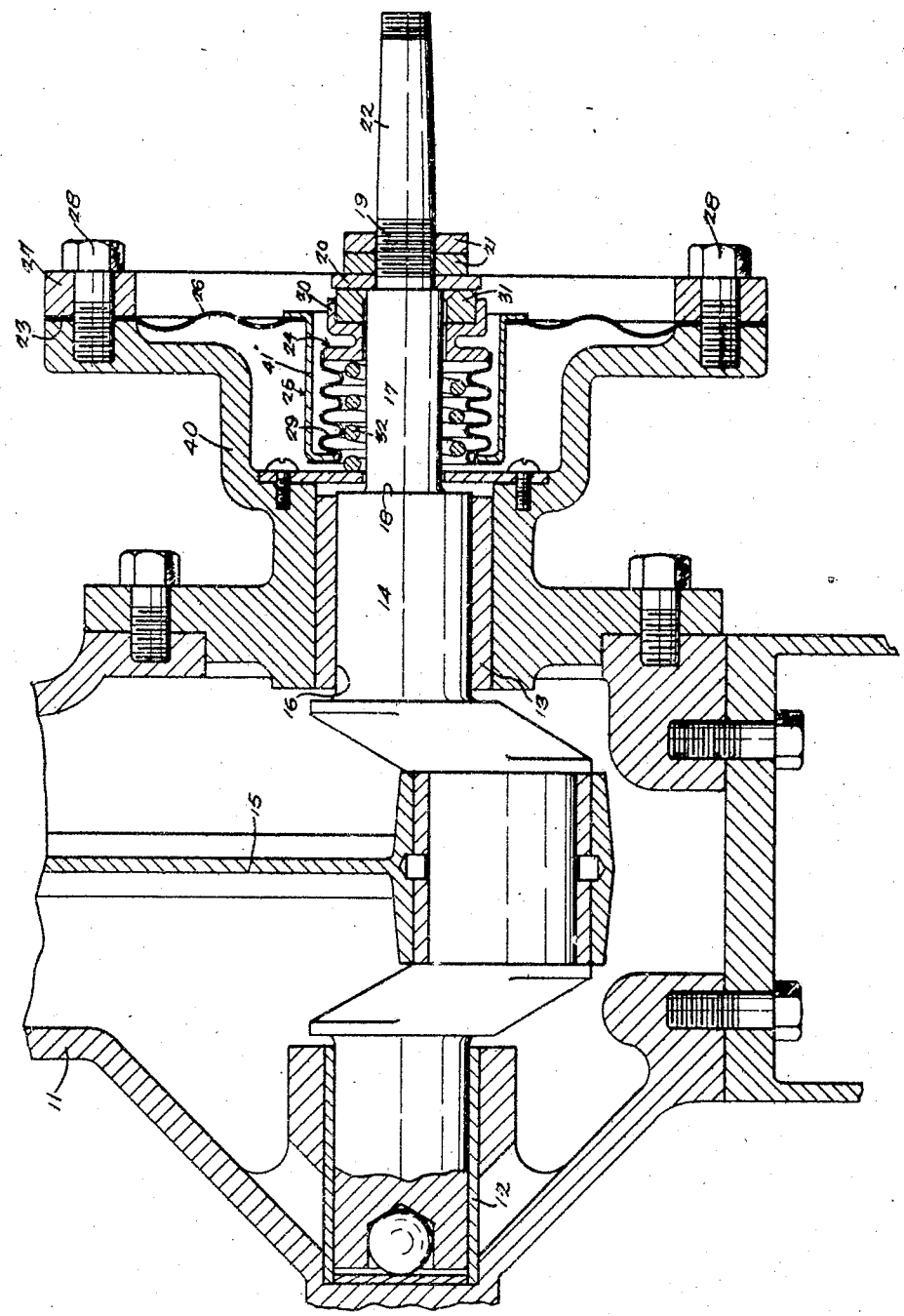
Charles C. Spreen
         Inventor
by Smith and Freeman
         Attorneys Patented Nov. 11, 1930

1,781,201

UNITED STATES PATENT OFFICE

CHARLES C. SPREEN, OF DETROIT, MICHIGAN

JOURNAL-BEARING SEAL

Application filed December 6, 1926. Serial No. 152,844.

My invention relates to seals for journal bearings, and particularly to means for sealing the drive shaft aperture in the casing of a refrigerant compressor, and the principal object of my invention is to provide new and improved means for this purpose. In the drawings accompanying this specification and forming a part of this application I have shown, for purposes of illustration, one form which my invention may assume, and in these drawings the single figure is a fragmentary central vertical section through a compressor showing the embodiment of my invention herein disclosed.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15, and projects beyond the open-end bearing 13 through a suitable aperture 16 in the casing 11, and is provided exteriorly of the casing 11 with a reduced extension 22 forming an annular shoulder 32 and adapted to receive on a screw-threaded section 19 a flange 20 held against the shoulder 32 by means of nuts 21 screw-threaded on the screw-threaded sections 19, and receiving a suitable driving connection, not shown; and the casing 11 is provided about the aperture 16 with an annular extension 40 carrying an annular casing seat 23 surrounding the aperture 16 and the crank shaft 14 passing therethrough.

Closing the aperture 16, particularly to prevent both the egress of refrigerant and the ingress of moisture, is a seal 24 herein shown as comprising a substantially radial flexible diaphragm portion 26 corrugated to increase its flexibility and having its outer periphery sealed to the casing seat 23 by means of an annular securing ring 27 secured to the annular extension 40 with the outer periphery of the diaphragm portion 26 disposed therebetween and fastened by means of suitable securing bolts 28 passing through the annular securing ring 27 into the annular extension 40. A substantially tubular relatively rigid portion 41 is attached at one end to the inner periphery of said radial diaphragm portion 26 and extends from said radial diaphragm portion 26 inwardly along the shaft 14 toward the casing 11. A substantially tubular flexible bellows portion 29 attached at one end to the adjacent end of the relatively rigid tubular portion 41, corrugated to increase its flexibility, extends from the relatively rigid tubular portion 41 outwardly along the shaft 14 away from the casing 11, and is attached at its other end to a base 30 carrying an attached friction ring. The ring 31 is held in rotary sealing engagement with the inner face of the annular flange 20 by means of a spring 32 compressed between the base 30 and the outer face of the casing 11.

From the above description it will be apparent to those skilled in the art that I have provided a seal provided with a diaphragm extending along and radially of the shaft, having its outer periphery disposed away from the casing sealed to the casing extension seat, and having its inner periphery also disposed away from the casing and rotatably sealed to the crank shaft by means of a spring urging the inner periphery of the seal outwardly from the compressor casing against an inwardly facing flange carried on the compressor crank shaft.

Under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

The combination with a casing having a shaft rotatably mounted in a journal formed therein, an annular extension disposed in spaced relation surrounding the shaft beyond the journal, a flexible annular diaphragm secured to an outer extremity of the extension, an elongated sleeve secured at one end to an interior portion of the diaphragm, a flexible bellows disposed within the sleeve and secured to the opposite end thereof, and means at the opposite end of the bellows for rotatably associating the latter with a portion of the shaft.

In testimony whereof I hereunto affix my signature.

CHARLES C. SPREEN.